United States Patent
Piirainen (10) Patent No.: US 10,101,159 B2
(45) Date of Patent: Oct. 16, 2018

(54) THREE AXIS GYROSCOPE

(71) Applicant: MURATA MANUFACTURING CO., LTD., Nagaokakyo-shi, Kyoto (JP)

(72) Inventor: Tommi Piirainen, Vantaa (FI)

(73) Assignee: MURATA MANUFACTURING CO., LTD., Nagaokakyo-Shi, Kyoto (JP)

( * ) Notice: Subject to any disclaimer, the term of this patent is extended or adjusted under 35 U.S.C. 154(b) by 173 days.

(21) Appl. No.: 15/095,299

(22) Filed: Apr. 11, 2016

(65) Prior Publication Data

US 2016/0305781 A1    Oct. 20, 2016

(30) Foreign Application Priority Data

Apr. 16, 2015 (FI) ...................................... 20155282

(51) Int. Cl.
*G01C 19/5733* (2012.01)
*G01C 19/5747* (2012.01)

(52) U.S. Cl.
CPC ..... *G01C 19/5733* (2013.01); *G01C 19/5747* (2013.01)

(58) Field of Classification Search
CPC  G01C 19/5733; G01C 19/5747; G01C 19/00; G01C 19/02; G01C 19/04; G01C 19/56; G01C 19/5642; G01C 19/5656; G01C 19/5719; G01C 19/5726; G01C 19/574
See application file for complete search history.

(56) References Cited

U.S. PATENT DOCUMENTS

| | | | | |
|---|---|---|---|---|
| 5,239,868 A | * | 8/1993 | Takenaka | G01C 19/5607 310/329 |
| 5,349,855 A | * | 9/1994 | Bernstein | G01C 19/5719 73/504.16 |
| 5,728,936 A | * | 3/1998 | Lutz | G01C 19/5747 73/504.12 |

(Continued)

FOREIGN PATENT DOCUMENTS

| CN | 101839718 A | 9/2010 |
|---|---|---|
| DE | 696 14 340 T2 | 5/2002 |

(Continued)

OTHER PUBLICATIONS

Taiwanese Search Report application No. 105109418 dated Dec. 21, 2016.

(Continued)

*Primary Examiner* — Natalie Huls
(74) *Attorney, Agent, or Firm* — Squire Patton Boggs (US) LLP (57) ABSTRACT

A micro-electro-mechanical device detects angular velocity, for example relating to a three axis gyroscope. The three axis gyroscope includes a two axis gyroscope structure and a one axis gyroscope structure. The gyroscope further includes a lever spring system coupling a linear drive mode oscillation of the two axis gyroscope structure and a linear drive mode oscillation of the one axis gyroscope structure into one combined primary motion. The lever spring system causes the one and two axis gyroscope structures to have equal drive mode oscillation amplitudes. A symmetrical arrangement of the lever spring system causes any reactive forces created in the lever spring system to cancel each other.

19 Claims, 6 Drawing Sheets

(56) References Cited

U.S. PATENT DOCUMENTS

| | | | | |
|---|---|---|---|---|
| 5,869,760 | A * | 2/1999 | Geen | G01C 19/5712 73/504.04 |
| 6,257,057 | B1 * | 7/2001 | Hulsing, II | G01C 19/5719 73/504.04 |
| 7,284,429 | B2 * | 10/2007 | Chaumet | G01C 19/5747 73/504.12 |
| 7,421,897 | B2 * | 9/2008 | Geen | G01C 19/574 73/504.12 |
| 7,461,552 | B2 * | 12/2008 | Acar | G01P 15/125 73/504.04 |
| 8,256,290 | B2 * | 9/2012 | Mao | G01C 19/5719 73/488 |
| 8,443,668 | B2 * | 5/2013 | Ohms | G01C 19/5747 73/504.12 |
| 8,459,110 | B2 * | 6/2013 | Cazzaniga | G01C 19/5747 73/504.12 |
| 8,479,575 | B2 * | 7/2013 | Kempe | G01C 19/5747 73/504.12 |
| 8,544,594 | B2 * | 10/2013 | Yacine | G01C 19/5747 181/113 |
| 8,850,886 | B2 * | 10/2014 | Kempe | G01C 19/574 73/504.04 |
| 9,038,461 | B2 * | 5/2015 | Kanemoto | G01C 19/5733 73/504.12 |
| 9,278,847 | B2 * | 3/2016 | Cazzaniga | G01C 19/5712 |
| 9,404,747 | B2 * | 8/2016 | Valzasina | G01C 19/5747 |
| 9,452,921 | B2 * | 9/2016 | Blomqvist | B81B 7/0058 |
| 9,470,526 | B2 * | 10/2016 | Coronato | G01C 19/5712 |
| 2004/0112134 | A1 | 6/2004 | Beitia | |
| 2004/0169244 | A1 * | 9/2004 | MacGugan | B81B 7/0074 257/416 |
| 2006/0042382 | A1 * | 3/2006 | DCamp | B81B 7/0074 73/493 |
| 2007/0266785 | A1 * | 11/2007 | Cadarelli | G01C 19/5719 73/504.16 |
| 2008/0276706 | A1 * | 11/2008 | Hartmann | G01C 19/5747 73/504.04 |
| 2010/0236327 | A1 | 9/2010 | Mao | |
| 2011/0308314 | A1 * | 12/2011 | Kempe | G01C 19/574 73/504.02 |
| 2012/0061172 | A1 | 3/2012 | Yacine | |
| 2012/0291548 | A1 * | 11/2012 | Kanemoto | G01C 19/574 73/504.12 |
| 2013/0031977 | A1 * | 2/2013 | Kempe | G01C 19/5747 73/504.04 |
| 2013/0277775 | A1 | 10/2013 | Roland et al. | |

FOREIGN PATENT DOCUMENTS

| | | |
|---|---|---|
| FR | 2 741 151 A1 | 5/1997 |
| FR | 2 821 422 A1 | 8/2002 |
| TW | 1469254 B | 1/2015 |
| WO | 2010/097275 A1 | 9/2010 |
| WO | WO 2010/097275 A1 | 9/2010 |

OTHER PUBLICATIONS

Finnish Search Report dated Nov. 27, 2015 corresponding to Finnish Patent Application No. 20155282.
International Searching Authority, PCT Invitation to Pay Additional Fees application No. PCT/IB2016/052058 dated Aug. 4, 2016.

* cited by examiner

THREE AXIS GYROSCOPE

BACKGROUND

Field

The present invention relates to a micro-electro-mechanical device for detecting angular velocity and especially to a three axis gyroscope.

Description of Related Art

Micro-Electro-Mechanical Systems, also called in short as MEMS can be defined as miniaturized mechanical and electro-mechanical systems where at least some elements have a mechanical functionality.

MEMS structures can be applied to quickly and accurately detect very small changes in physical properties. For example, a microelectronic gyroscope can be applied to quickly and accurately detect very small angular displacements.

Motion has six degrees of freedom: translations in three orthogonal directions and rotation around three orthogonal axes. The latter can be measured by an angular rate sensor, also known as gyroscope. In MEMS gyroscopes, Coriolis Effect is used to measure angular rate. When a mass is moving in one direction called primary motion and rotational angular velocity is applied, the mass experiences a force in orthogonal direction as a result of the Coriolis force. Resulting physical displacement caused by the Coriolis force may be then read from, for example, a capacitive, piezoelectrical or piezoresistive sensing structure. The displacement due to the Coriolis Effect may also be called detection motion or sense mode. The primary motion may alternatively be called primary mode or drive mode.

In a MEMS gyroscope, mechanical oscillation is used as the primary motion. When an oscillating gyroscope is subjected to an angular motion orthogonal to the direction of the primary motion, an undulating Coriolis force results. This creates a secondary oscillation, also referred to as the detection motion, orthogonal to the primary motion and to the axis of the angular motion, and at the frequency of the primary oscillation. The amplitude of this coupled oscillation can be used as the measure of the angular rate, i.e. the absolute value of angular velocity.

WO2010/097275 presents an electromechanical microsensor having three drive elements for determining two or three components of the yaw rate vector of the substrate. Three drive elements are connected to one another for synchronizing the driving movements by means of a coupling device. A problem relating to the presented solution is that reaction forces of the rotating coupling device between the drive elements introduce components to the motion of the drive elements that deviate from the optimal mutually perpendicular direction of the driving motion.

SUMMARY

An object of the present invention is to provide a method and apparatus so as to overcome the prior art disadvantages. Objects of the present invention are achieved with an apparatus as disclosed and claimed herein.

Embodiments of the present invention are based on the idea of integrating two and one axis gyroscopes with push and pull type coupling spring lever arrangement.

The present invention has the advantage that by arranging the coupling symmetrically between the two gyroscopes, achieved drive movement is linear for both gyroscopes.

While the three axis gyroscope is intended for detecting angular velocity in any direction, it's important that the three detection axes are mutually perpendicular. This simplifies the signal processing, as the received detection signals along different axes are mutually independent.

One dimensional linear primary motion may be used to measure rotation speed around two perpendicular axes. In order to achieve three mutually perpendicular detection axes, at least two mutually perpendicular linear primary motions are required. In the following example, two linear drive mode oscillations are provided which are perpendicular to each other. A lever spring system used to couple a first linear drive mode oscillation of a first gyroscope into a second linear drive mode oscillation of a second gyroscope enables not only exciting the two gyroscopes into synchronized linear drive mode oscillations perpendicular each other, but even having equal amplitudes. When equal proof masses having equal amplitude drive mode oscillations (primary motion) are subject to same angular velocity, equally strong Coriolis force is caused for each. If even the detection capacitances are configured equal for both proof masses, equal sensitivity is achieved.

According to a first aspect, a three axis gyroscope is provided, including a first gyroscope structure and a second gyroscope structure, wherein one of the first and second gyroscope structures comprises a two axis gyroscope structure and another of the first and second gyroscope structures comprises a one axis gyroscope structure, and the gyroscope further comprises a lever spring system coupling a first linear drive mode oscillation of said first gyroscope structure and a second linear drive mode oscillation of said second gyroscope structure into one combined primary motion.

According to a second aspect, a three axis gyroscope is provided wherein the first gyroscope structure is driven to the first linear drive mode oscillation by at least two driving actuators and the first linear drive mode oscillation of said first gyroscope structure is coupled to a second linear drive mode oscillation of the second gyroscope structures by the lever spring system connecting said first and second gyroscope structures.

According to a third aspect, a three axis gyroscope of is provided, wherein the first linear drive mode oscillation is perpendicular to the second linear drive mode oscillation.

According to a fourth aspect, a three axis gyroscope is provided, wherein said lever spring system comprises a symmetrical arrangement of at least two lever and spring structures configured to mutually couple the drive masses of said first and second gyroscope structures, each lever and spring structure comprising a first lever coupled with said first gyroscope structure longitudinally aligned with the first linear drive mode oscillation of said first gyroscope structure, a second lever coupled with said second gyroscope structure longitudinally aligned with the second linear drive mode oscillation of said second gyroscope structure, wherein the first lever and the second lever are attached to each other in a 90 degree angle at one end of the levers and said lever and spring arrangement further includes an oblique spring attached to a point of attaching the first lever and the second lever in a 45 degree angle with respect to the first lever and the second lever.

According to a fifth aspect, a three axis gyroscope is provided, wherein said oblique spring is configured to cause the first lever and the second lever to move equally long distance away from their equilibrium positions in perpendicular directions, and/or to cause drive masses of the first and the second gyroscope structures to have equal linear drive mode oscillation amplitudes.

According to a sixth aspect, a three axis gyroscope is provided, wherein the first lever is coupled to a drive mass of said first gyroscope structure, and the longitudinal dimension of said first lever is aligned with the first linear drive mode oscillation of said first gyroscope structure, and the second lever is coupled to a drive mass of said second gyroscope structure, and the longitudinal dimension of said second lever is aligned with the second linear drive mode oscillation of said second gyroscope structure.

According to a seventh aspect, a three axis gyroscope is provided, wherein said lever spring system comprises an even number of said lever and spring structures arranged symmetrically on opposite sides of a symmetry axis of the gyroscope in the plane of the device.

According to an eighth aspect, a three axis gyroscope is provided, wherein the second gyroscope structure is disposed in an opening within the periphery of the first gyroscope structure, and the lever spring system comprises an even number of lever and spring structures arranged symmetrically on opposite sides of the second gyroscope structure, so that the opposite reactive forces caused by said lever and spring structures on the second gyroscope structure cancel each other and the parallel driving forces caused by said lever and spring structures sum with each other, causing coupling of the first linear drive mode oscillation of the first gyroscope structure into a second linear drive mode oscillation of said second gyroscope structure.

According to a ninth aspect, a three axis gyroscope is provided, wherein said first gyroscope structure comprises a two axis gyroscope structure, and said second gyroscope structure comprises a one axis gyroscope structure.

According to a tenth aspect, a three axis gyroscope is provided, wherein said two axis gyroscope structure comprises two pairs of proof masses, each pair configured for detecting angular velocity on a different axis of motion.

According to an eleventh aspect, a three axis gyroscope is provided, wherein the detection motion of each proof masse of said first and second gyroscope structures is linear oscillation.

According to a twelfth aspect, a three axis gyroscope is provided, wherein said two axis gyroscope structure is configured to be driven by exciting into the first linear drive mode oscillation in the x-axis direction within the plane of the device, and for a first pair of proof masses of the two axis gyroscope structure is configured to be caused a linear detection motion in y-axis direction by angular velocity about the z-axis and a second pair of proof masses of the two axis gyroscope structure is configured to have linear detection motion in the z-axis direction by angular velocity about the y-axis, and said one axis gyroscope structure is configured to be driven by coupling into the second linear drive mode oscillation in the y-axis direction within the plane of the gyroscope structure, and a pair of proof masses of the one axis gyroscope structure is configured to be caused a linear detection motion in the z-axis direction by angular velocity about the x-axis.

According to a thirteenth aspect, a three axis gyroscope is provided, wherein at least one pair of proof masses is mutually coupled with a lever allowing linear detection motion of the mutually coupled pair of proof masses in opposite phase and preventing linear detection motion of the mutually coupled pair of proof masses in same phase.

According to a fourteenth aspect, a three axis gyroscope is provided, wherein said lever coupling the respective pair of proof masses is, in detection motion, in rotating motion about the detection axis of the respective pair of proof masses.

BRIEF DESCRIPTION OF THE FIGURES

In the following the invention will be described in greater detail, in connection with preferred embodiments, with reference to the attached drawings, in which.

DETAILED DESCRIPTION

A one axis gyroscope refers to a gyroscope that is capable of detecting angular velocity about one axis. Correspondingly, a two axis gyroscope is capable of detecting angular velocity about two axes. A three axis gyroscope is capable of detecting angular velocity about three different axes.

With expression "coupling" between two structural elements, we may refer to direct coupling, or a coupling with one or more intermediate elements, such as beams or springs.

"Driving actuator" refers to a structure used for generating the needed force for exciting a drive mass and related proof mass(es) into a primary oscillation. A driving actuator may be comprise for example driving comb structure causing electrostatic actuation or a piezo actuator arranged for example in the springs of the drive mass, or any other structure or arrangement useful for generating like suitable force.

"Linear oscillation" refers to translational oscillation where inertial element deflection occur linearly, along a straight axis. When the inertial elements of the device are not excited to any motion, they are said to be in their equilibrium position. In linear oscillation, the inertial element returns to its equilibrium position twice during every cycle of oscillation. In an ideal linear oscillation, restoring force caused by springs supporting the inertial element varies linearly with position, i.e. the distance from the equilibrium position. The further the inertial element moves from the equilibrium position, the stronger the restoring force becomes. When the inertial element of a linear oscillator is moved away from the equilibrium position by a force, at some point the restoring force becomes strong enough to cause reverting the direction of the movement back towards the equilibrium position. In practical MEMS devices, there is always some damping involved, but the driving force brings energy in the system so that the proof-mass is in practice in linear oscillation.

"Plane of device" refers to the plane formed by the inertial elements of the MEMS device when they are in rest, i.e. not excited into any motion. This plane may also be described with coordinates as the xy-plane.

Rotational oscillation of a drive mass and/or a proof mass about an axis may be utilized in a MEMS device as primary or secondary motion.

Figure 1:
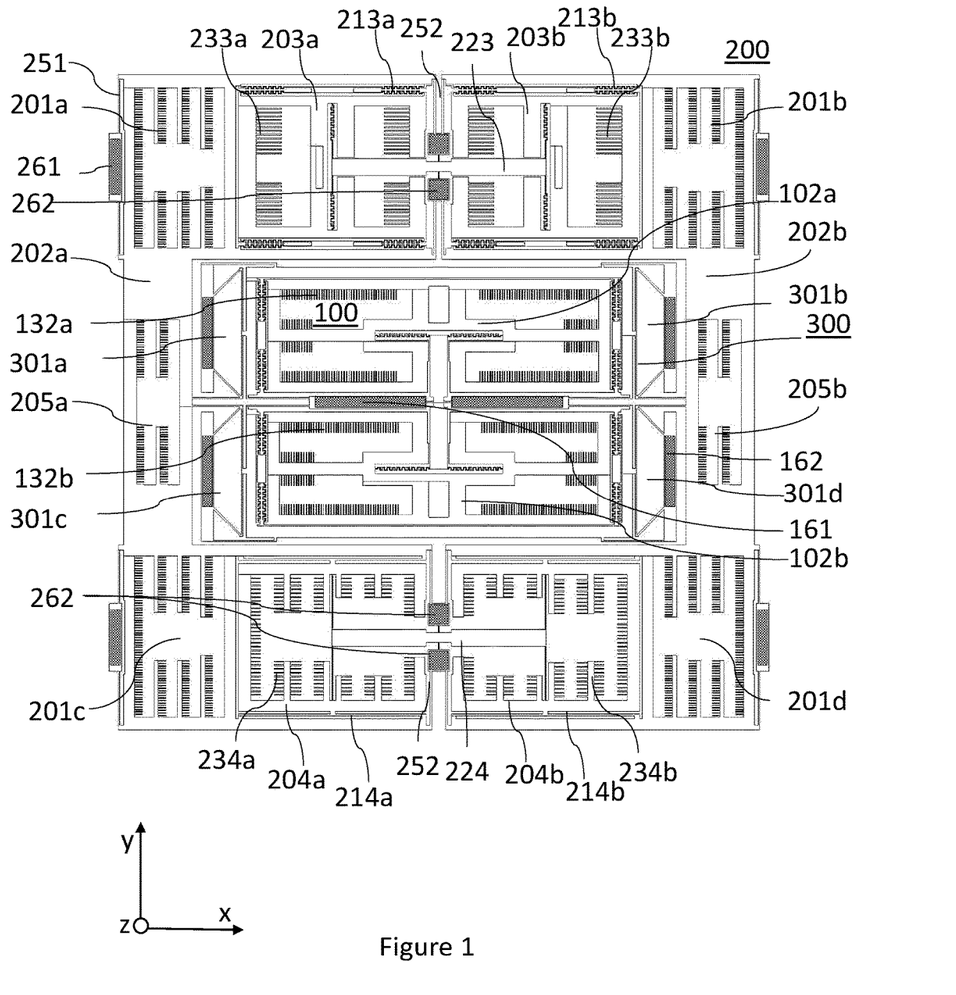
FIG. 1 presents a first exemplary layout of a three axis gyroscope.

FIG. 1 shows an exemplary embodiment for layout of a three axis gyroscope. This layout corresponds to a mask that may be used for creating the inertial parts of the gyroscope. The three axis gyroscope comprises two linear gyroscope structures: a one axis gyroscope structure (100) forming a quadrangle form in the middle of the structure, and a two axis gyroscope structure (200) surrounds the one axis gyroscope structure (100) like a frame. Instead of a form like a frame like in this example, a drive mass may take various forms, as known by a person skilled in the art. With "linear gyroscope structure" we refer to a gyroscope structure that is configured for a linear primary motion as opposed to a rotating primary motion. We'll use term "gyroscope structure" for referring to either of the elements (100, 200), and term "gyroscope" for referring to the system as a whole.

To simplify the description, we may place coordinates to the figure. We may consider the origin being placed in the middle of the gyroscope, in the symmetry point, and x-axis traverses to left and right in the plane of the device, y-axis traverses up and down in the plane of the device, and z-axis direction is perpendicular to both x- and y-axis, traversing through the plane of the device. The location of the origin may also be chosen differently when appropriate, but the directions of the axes will remain the same throughout the description. In the figures, we have marked the coordinates outside the gyroscope for clarity reasons.

It should also be noticed that for clarity purposes, the layout figures only shows the functional parts of the gyroscope that are necessary for explaining the structure of the device, namely the inertial parts and suspension structures supporting these inertial parts. In example, only one half of the comb electrode structures are shown in the layout, representing the moving parts of the comb electrodes (rotor). A person skilled in the art understands that an actual structure also includes stationary electrodes (stators), which are not visible in this figure.

In this example, the gyroscope is excited to primary motion by the comb-type driving actuators (201a, 201b, 201c, 201d) arranged near to each corner of the two axis gyroscope structure (200). The driving actuators (201a-d) are preferably arranged symmetrically in order to cause symmetrical driving forces for facilitating creation of a linear drive mode oscillation for the two axis gyroscope structure (200). Symmetrical arrangement improves linearity of the drive mode oscillation of the two axis gyroscope structure (200). In this exemplary arrangement, the driving actuators (201a-d) are coupled with a drive mass structure (202) of the two axis gyroscope structure (200), comprising two drive mass parts (202a, 202b). The drive mass (202) structure is flexibly coupled to a number of suspension structures (261, 262), which are easily recognized in the figure as dark patterned rectangles. Only some references for the suspension structures have been marked from the figure for clarity, but it may be seen that an even number of similar suspension structures (in this example 4) have been arranged to support the drive mass structure (202) in symmetrical manner. Suspension structures (161, 162, 261, 262) may have multiple roles in the design, so that a single suspension structure may also support more than one inertial element. Alternatively, separate suspension structures may be provided for some or all purposes.

In the exemplary embodiment of FIG. 1, the driving actuators (201a-d) are electrical comb actuators. These driving actuators (201a-d) cause a linear primary motion to the two-axis gyroscope (200) that occurs along x-axis. It can be noticed that the two axis gyroscope structure (200) is reflection symmetrical in relation to the y-axis of the device. When the two axis gyroscope structure (200) is excited to the linear primary motion, the part of the two axis gyroscope structure (200) left of the y-axis oscillates in opposite direction to the part of the two axis gyroscope structure (200) right of the y-axis. We call this linear primary motion as the first linear drive mode oscillation. The drive mass parts (202a, 202b) are coupled with two pairs of proof masses (203a, 203b; 204a, 204b), which may also be called as detection masses. The proof masses (203a, 203b, 204a, 204b) are coupled to the drive mass parts (202a, 202b) with beams or springs (213a, 213b, 214a, 214b) that are stiff in the direction of the first linear drive mode oscillation so that each proof mass moves along the respective drive mass part (202a, 202b) when excited to primary motion. Thus, we may say that the entire two axis gyroscope structure (200) is excited into the first linear drive mode oscillation. Although just one exemplary beam or spring has been indicated for each proof mass, it should be noted that the coupling arrangement actually includes more than one beam or spring. Preferably, the coupling arrangement between the drive mass parts (202a, 202b) and the respective proof masses (203a, 203b, 204a, 204b) forms a symmetrical arrangement for each pair of the proof masses (203a, 203b; 204a, 204b) in relation to an axis parallel with the primary motion (x-axis). Proof masses marked with suffix "a" (203a, 204a) are coupled with the drive mass part with suffix "a" (202a), and proof masses marked with suffix "b" (203b, 204b) are coupled with the drive mass part with suffix "b" (202b). While the drive mass parts (202a, 202b) oscillate in opposite direction when driven into the primary motion, also each pair of proof masses (203a, 203b; 204a, 204b) is in first drive mode oscillation where the first linear drive mode oscillation of the first pair of proof masses (203a, 203b) occurs in mutually opposite phases, and the first linear drive mode oscillation of the second pair of proof masses (204a, 204b) occurs in mutually opposite phases. Both drive mass parts (202a, 202b) have also detection arrangements (205a, 205b), such as detection combs, that may be used for detecting the primary motion. This detection may be used for example as feedback method for adjusting the magnitude and phase of the exciting forces caused with the driving actuators (201a-d).

Each pair of proof masses (203a, 203b; 204a, 204b) of the two axis gyroscope structure (200) is configured for detecting angular rate in different direction.

First pair of proof masses (203a, 203b) is coupled to supporting structures in a way that allows the first pair of proof masses (203a, 203b) a linear detection motion occurring up and down from the plane of the device, in direction of the z-axis. This detection motion occurs when the two axis gyroscope structure (200) is subjected to angular velocity in y-axis direction. While the first pair of proof masses (203a, 203b) are in first linear drive mode oscillation along x-axis in opposite phase, the detection motion of the two first proof masses (203a, 203b) also occurs in opposite phase, so that when one of the first proof masses (203a, 203b) moves up towards the positive z-axis, the other one moves down towards the negative z-axis. Although the detection motion of each of the first proof masses (203a, 203b) is mainly linear, the detection motion may as a whole be described as a kind of a see-saw motion about the y-axis. The first pair of proof masses (203a, 203b) may be further coupled with each other with a first coupling lever (223) that allows the first proof masses (203a, 203b) to have detection motion in opposite phase, but prevents detection motion in same phase. In this example, detection combs (233a, 233b) are used for detecting of the movement of the first pair of proof masses (203a, 203b).

Figure 5:
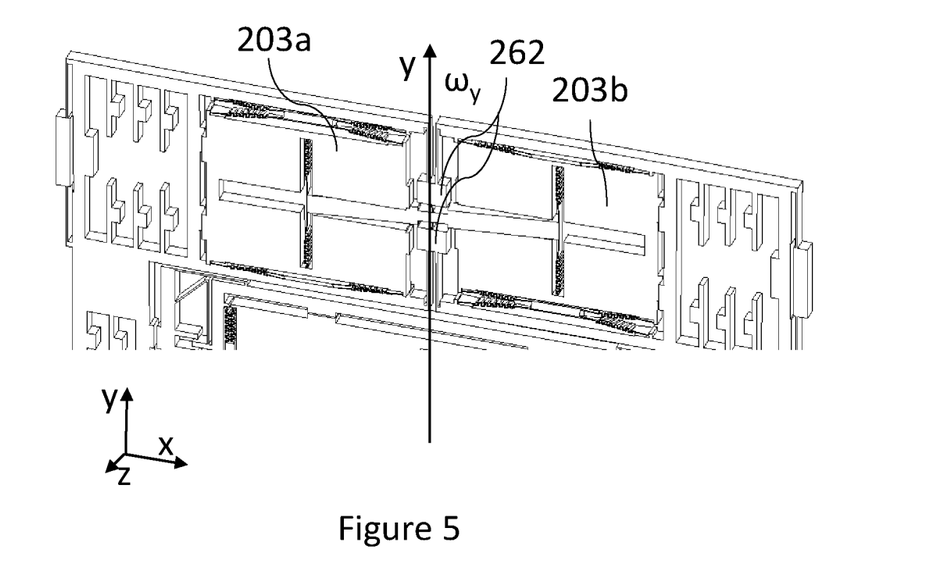
FIG. 5 illustrates a phase of detection motion one proof mass pair of the two axis gyroscope structure.

FIG. 5 further illustrates one phase of the detection motion of the first pair of proof masses (203a, 203b) of the two axis gyroscope structure (200). It may be seen how the left side proof mass (203a) has moved "up" from the plane of the device towards the positive z-axis whereas the right side proof mass (203b) has moved "down" from the plane of the device towards the negative z-axis. This motion may be illustrated as a see-saw motion about the illustrated y-axis, which motion may be marked with $\omega_y$. The see-saw motion $\omega_y$ may be described as a special type of rotating motion, since it includes linear components: the movement of the proof masses (203a, 203b) is mainly linear oscillation in z-axis direction. The first pair of proof masses (203a, 203b) are each respectfully coupled with the respective drive mass (202a, 202b) with beams or springs (213a, 213b). In addition to mutual coupling of the proof masses (203a, 203b) and the drive masses (202a, 202b), this coupling is configured to inhibit rotation of the proof masses (203a, 203b) so that their detection movement is mainly linear oscillation in z-axis direction. The first coupling lever (223) coupling the first pair of proof masses (203a, 203b) with each other is in rotating motion about the y-axis. The first coupling lever (223) is coupled to suspension structures (262) along the y-axis with torsion springs (not marked with reference) allowing the rotating movement of the first coupling lever (223) about the y-axis along with the detection motion of the first pair of proof masses (203a, 203b). The first coupling lever (223) is coupled with the first pair of proof masses (203a, 203b) with springs that are relatively stiff in the direction of the detection motion (z-axis), in order to couple the phases of the proof masses (203a, 203b) and the first coupling lever (223) with each other. The first coupling lever (223) ensures that the detection motion of the first pair of proof masses (203a, 203b) is in opposite phase, and that the detection signals obtained with the sensing electrodes measuring the movement of the first pair of proof masses (203a, 203b) have equal amplitudes.

Returning to FIG. 1, second pair of proof masses (204a, 204b) is coupled to supporting structure in a way that allows the second pair of proof masses (204a, 204b) a detection motion along y-axis, in the plane of the device. This detection motion occurs when the two axis gyroscope structure (200) is subjected to angular velocity in z-axis direction. While the second pair of proof masses (204a, 204b) are in first linear drive mode oscillation along x-axis in opposite phase, the detection motion also occurs in opposite phase, so that when one of the second proof masses (204a, 204b) moves up towards the positive y-axis, the other one moves down towards the negative y-axis. This detection motion of the second pair of proof masses is mainly linear oscillation in y-axis direction. The second pair of proof masses (204a, 204b) may be further coupled with each other with a second coupling lever (224) that allows the second proof masses (204a, 204b) to have detection motion in opposite phase, but prevents detection motion in same phase. In this example, detection combs (234a, 234b) are used for detecting of the movement of the second pair of proof masses (204a, 204b).

Figure 6:
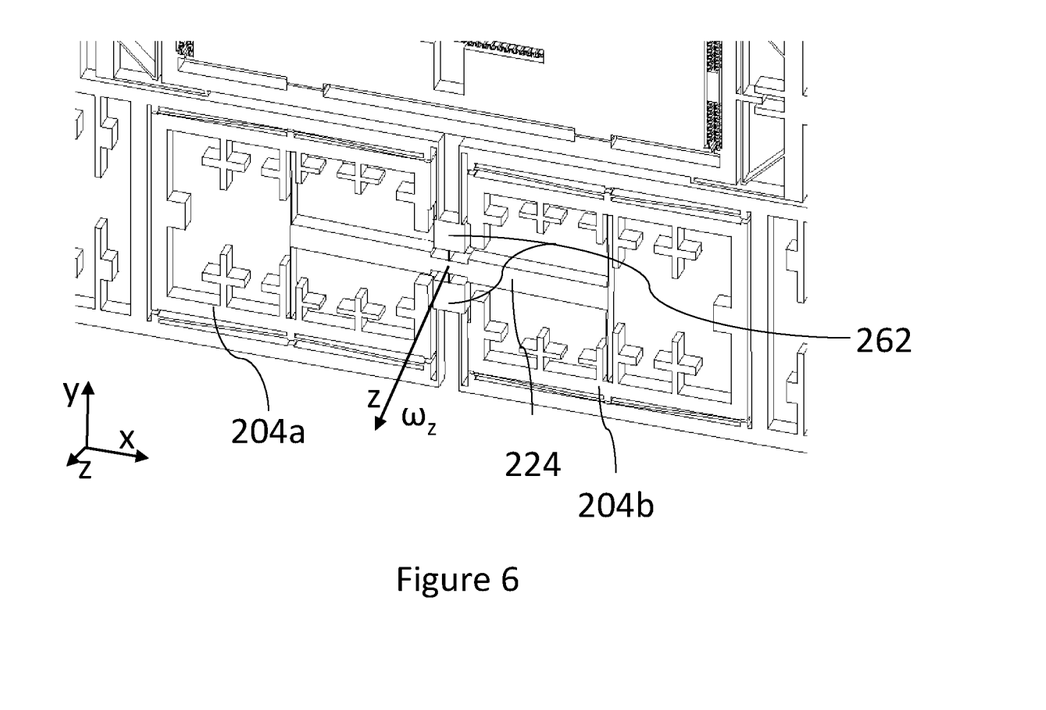
FIG. 6 illustrates a phase of detection motion another proof mass pair of the two axis gyroscope structure.

FIG. 6 further illustrates the detection motion of the second pair of proof masses (204a, 204b) of the two axis gyroscope structure (200). The detection motion of the second pair of proof masses (204a, 204b) occurs in the plane of the device. Thus, this detection motion is suitable for detection with comb structure, for example. The detection motion of the second pair of proof masses (204a, 204b) is linear oscillation occurring in y-axis direction. In FIG. 6 we may see that the left side proof mass (204a) has moved towards the positive y-axis and that the right side proof mass (204b) has moved towards the negative y-axis. This detection motion may be illustrated as a rotating motion $\omega_z$ about the illustrated z-axis. This rotating motion co, may be described as a mixture of rotating motion and linear motion, since it includes both rotating and linear components. The second pair of proof masses (204a, 204b) are each respectfully coupled with the respective drive mass (202a, 202b). This coupling may be used to inhibit rotation of the proof masses (204a, 204b) so that their detection movement is mainly linear oscillation in y-axis direction. The second coupling lever (224) may couple the proof masses of the second pair of proof masses (204a, 204b) with each other. This second coupling lever (224) is in rotating motion about the z-axis. The second coupling lever (224) is coupled to suspension structures (262) along the y-axis with springs allowing the rotating movement of the first coupling lever (224) along with the detection motion of the second pair of proof masses (204a, 204b). The second coupling lever (224) is coupled with the second pair of proof masses (204a, 204b) with springs or beams (not marked with reference) that are relatively stiff in the direction of the detection motion (y-axis), in order to couple the phases of the proof masses (204a, 204b) and the first coupling lever (224) with each other. While inhibiting detection motion in same phase, the second coupling lever (224) ensures that the detection motion of the second pair of proof masses (204a, 204b) is in opposite phase, and that the detection signals obtained with the sensing electrodes measuring the movement of the second pair of proof masses (204a, 204b) have equal amplitudes.

In the previous example, the one axis gyroscope structure (100) is driven to the primary motion by coupling it to the primary motion of the two axis gyroscope structure (200) with a lever spring system (300). We'll first explain the functions of the one axis gyroscope structure (100), and then describe the lever spring system (300). We'll describe functionality of the one axis gyroscope (100) and the lever spring system (300) in relation to FIG. 2 together with explaining the differences between the two embodiments.

Figure 2:
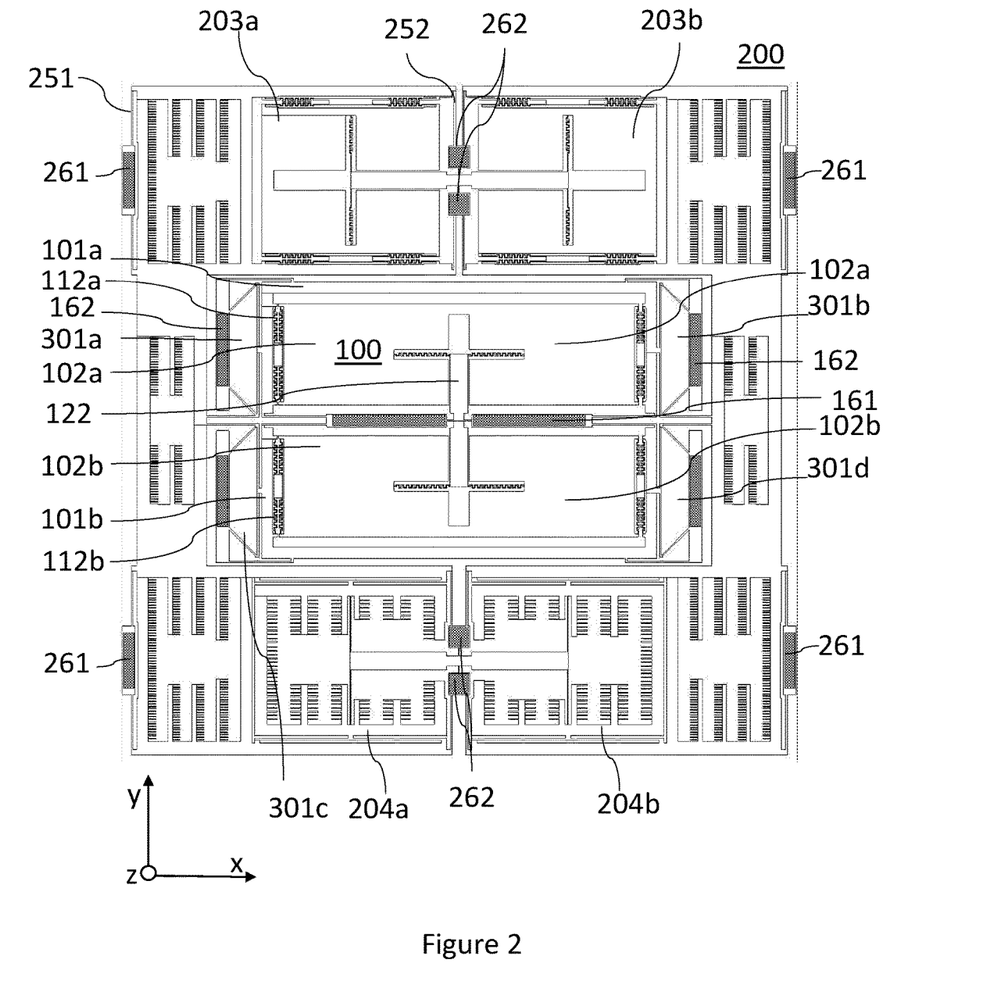
FIG. 2 presents a second exemplary layout of a three axis gyroscope.

FIG. 2 shows a second exemplary embodiment for layout of a three axis gyroscope. The basic structure of the gyroscope is similar to the functionality of the gyroscope described in FIG. 1. Main difference is in the method of detection used with some of proof masses.

The two axis gyroscope (200) presented in FIG. 2 is functionally similar to the one explained in connection with FIG. 1. Difference in structure may be seen for example in relation to the first proof masses (203a, 203b). In this embodiment, the detection combs have been removed from the first proof masses (2031, 203b). Instead, the proof masses (203a, 203b) are more solid mass structures that have more mass than if the detection combs were used. This kind of proof masses may be used with capacitive cap electrodes for detecting the sensing movement of the proof masses. Also the structure of detection masses (102a, 102b) of the one axis gyroscope structure this second embodiment have no combs like in FIG. 1, but are configured to be used with capacitive cap electrodes.

The one axis gyroscope structure (100) has a primary motion in y-axis direction, perpendicular to the direction of the primary motion of the two axis gyroscope structure. This is a linear oscillation occurring in the plane of the device, also called as second linear drive mode oscillation. The one axis gyroscope structure includes a drive mass (101) comprising two drive mass parts (101a, 101b), and two proof masses (102a, 102b). The drive mass structure may also be called as a drive frame. The proof masses (102a, 102b) are coupled with the drive mass parts (101a, 101b) with beams or springs (112a, 112b) that are stiff in the direction of the second linear drive mode oscillation (y-axis) of the one axis gyroscope structure (100), thus causing the proof masses (102a, 102b) to move along the drive mass parts (101a, 101b). The two drive mass parts (101a, 101b) are driven into the second linear drive mode oscillation in opposite phases. When one drive mass part (101a, 101b) moves towards the positive y-axis, the other moves towards the negative y-axis.

The proof masses (102a, 102b) are flexibly coupled with the respective drive masses (101a, 101b) so that they are capable of moving in y-axis direction and in z-axis direction. In y-axis direction, the coupling between the drive masses (101a, 101b) is relatively stiff, so that each of the proof masses (102a, 102b) move along the respective drive mass (101a, 101b). We can thus say that when the three axis gyroscope is excited to primary motion, both the drive masses (101a, 101b) and the proof masses (102a, 102b) are in second linear drive mode oscillation. Angular velocity in x-axis direction causes Coriolis force to the proof masses (102a, 102b) that are in second linear drive mode oscillation in y-axis direction, which causes the detection motion of the proof masses (102a, 102b) in z-axis direction. While the proof masses (102a, 102b) are in second linear drive mode oscillation in opposite phases, the detection motion will also occur in opposite phases, causing the proof masses (102a, 102b) to a linear detection motion occurring on opposite sides of the x-axis. This detection motion may be characterized as a see-saw motion about the x-axis. The proof masses (102a, 102b) may be further coupled with each other with a third coupling lever (122) that allows the proof masses (102a, 102b) to have detection motion in opposite phase, but prevents detection motion in same phase. In the embodiment of FIG. 2, the proof masses (102a, 102b) are arranged to be used with cap electrodes for detecting the movement of the proof masses (102a, 102b). Comparing with the embodiment presented in FIG. 1, it can be noticed that in FIG. 1 the proof masses have comb electrodes (132a and 132b) for detection purposes.

Figure 7:
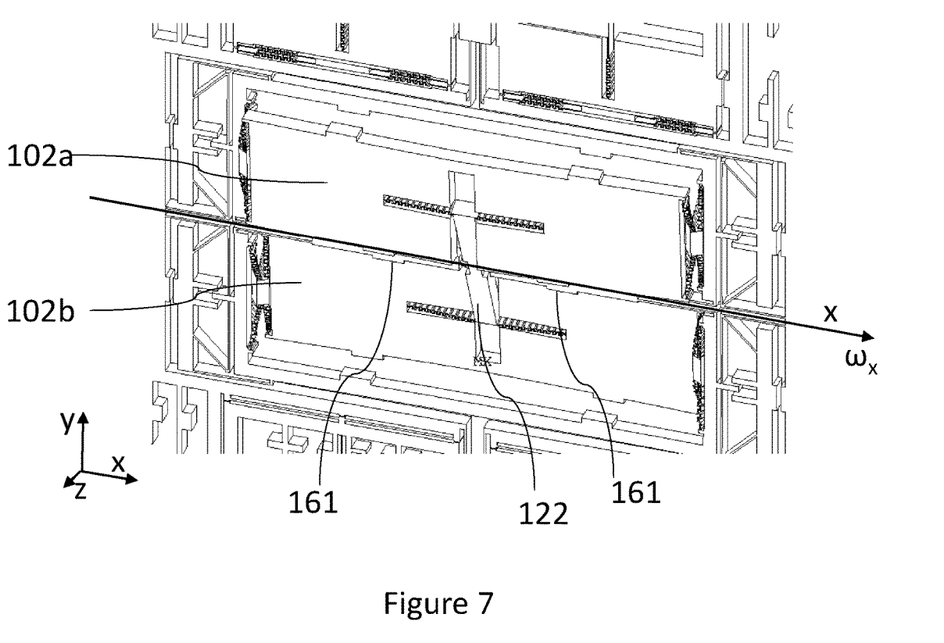
FIG. 7 illustrates a phase of detection motion of the one axis gyroscope structure.

FIG. 7 further illustrates detection motion of the proof masses (102a, 102b) of the one axis gyroscope structure (100). It may be seen how the proof mass 102a has moved "up" from the plane of the device towards the positive z-axis whereas the proof mass 102b has moved "down" from the plane of the device towards the negative z-axis. Although the movement of the proof masses (102a, 102b) is mainly linear oscillation in y-axis direction, this motion may be illustrated as a see-saw motion $\omega_x$ about the illustrated x-axis. This see-saw motion $\omega_x$ can be seen to include both linear and rotating elements. The proof masses (102a, 102b) are each respectfully coupled with the respective drive mass (101a, 101b). This coupling may be used to reduce or inhibit rotation of the proof masses (102a, 102b) so that detection motion of each individual proof mass is mainly in linear oscillation in z-axis direction. The proof masses (102a, 102b) oscillate on opposite sides of the x-axis in opposite phase, which may be considered as a kind of rotating motion around the x-axis, as the proof masses in detection motion have momentum with respect to the x-axis. A third coupling lever (122) coupling the proof masses of the proof masses (102a, 102b) with each other is in rotating motion about the x-axis. The third coupling lever (122) is coupled to suspension structures (161) along the x-axis with torsion springs allowing the rotating movement of the third coupling lever (122) around x-axis along with the detection motion of the proof masses (102a, 102b). The third coupling lever (122) is coupled with the proof masses (102a, 102b) with springs that are relatively stiff in the direction of the detection motion (z-axis), in order to couple the phases of the proof masses (102a, 102b) and the first coupling lever (122) with each other. The third coupling lever (122) ensures that the detection motion of the proof masses (102a, 102b) is in opposite phase, and the detection signal obtained with the sensing electrodes measuring the movement of the proof masses (102a, 102b) is equal.

Continuing with FIG. 2, it may be noticed that the one axis gyroscope structure (100) does not have any driving actuators of its own for exciting it into the primary motion. The primary motion of the two axis gyroscope structure (200) is coupled to the one axis gyroscope structure (100) with a lever spring system (300) that causes the one axis gyroscope structure (100) to be driven into second drive mode oscillation of the common primary motion of the three axis gyroscope. In this common primary motion, both gyroscope structures (100, 200), including the drive masses (101a, 101b, 202a, 202b) and the proof masses (102a, 102b, 203a, 203b, 204a, 204b) of the two gyroscope structures may have equal drive mode oscillation amplitudes.

The one axis gyroscope structure (100) is located in an opening within the periphery of the two axis gyroscope structure (200). This location is beneficial as it allows arrangement of a symmetrical structure for the three axis gyroscope. When the placement of the one and two axis gyroscope structures (100, 200) is symmetrical, the lever spring system (300) that will be described next can beneficially be arranged in symmetrical manner between the two gyroscope structures (100, 200) thus facilitating symmetrical coupling of the driving forces between the two gyroscope structures (300). Other arrangements may be developed having like symmetry facilitating benefits without departing from the scope.

The lever spring system (300) comprises a symmetrical arrangement of lever and spring structures arranged to mutually connect the drive masses (101a, 101b) of the one axis gyroscope structure (100) and the drive masses (202a, 202b) of the two axis gyroscope structure (200). It can be noticed that the spring lever system (300) arrangement has reflection symmetry in view of both an x-axis and a y-axis direction symmetry axes. For example, the lever spring system (300) may comprise four lever and spring structures (301a, 301b, 301c, 301d) arranged symmetrically in relation to the x- and the y-axis of the device. In alternative embodiments, the number of lever spring structures may be other than four, but it's preferably an even number, enabling a symmetrical arrangement.

Figure 3:
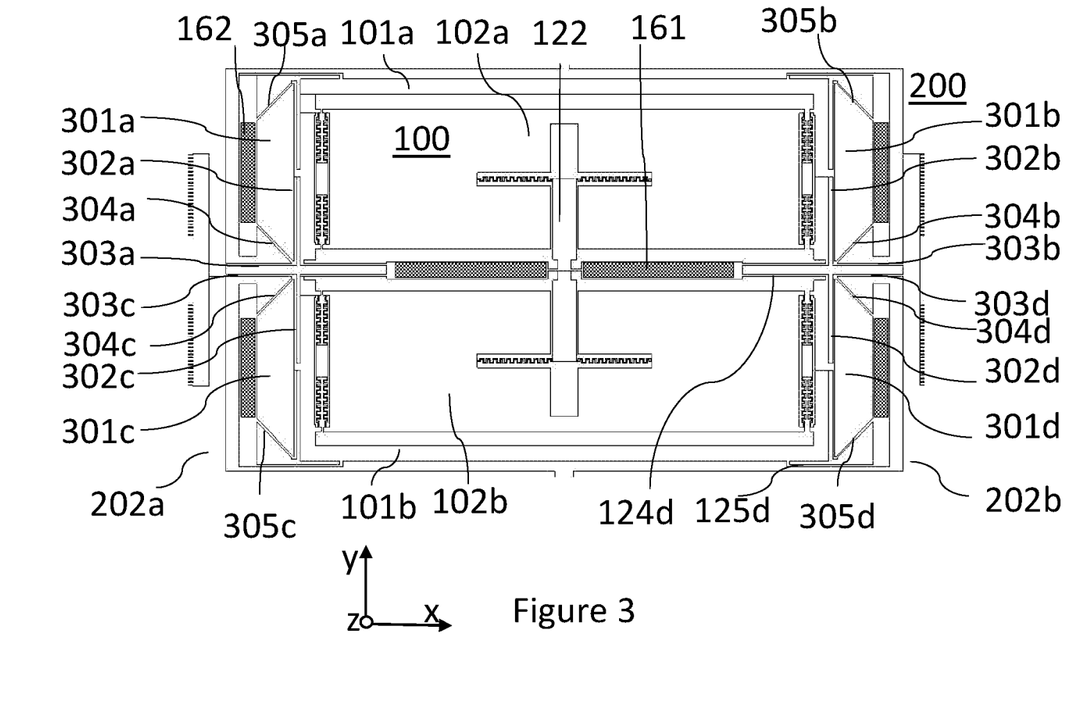
FIG. 3 shows a detail from the gyroscope structure.

FIG. 3 shows a detail from the gyroscope structure of FIG. 2. We'll now explain the functionality of the lever spring system (300) in connection to FIG. 3. Embodiment in FIG. 1 has similar lever spring system (300), but the numbering of the details of the lever spring system (300) has been omitted in FIGS. 1 and 2 for clarity reasons.

In FIG. 3, we can see four lever and spring structures (301a, 301b, 301c, 301d), which are basically similar to each other, although mirror images with respect to the two symmetry axes. The lever and spring structures (301a, 301b, 301c, 301d) are located at a non-zero distance from at least one symmetry axis. Each lever and spring structure (301a, 301b, 301c, 301d) includes a first lever (302a, 302b, 302c, 302d) longitudinally aligned with the second linear drive mode oscillation of the one axis gyroscope structure (100), in this case along the y-axis. Further, each lever and spring structure (301a, 301b, 301c, 301d) includes a second lever (303a, 303b, 303c, 303d) longitudinally aligned with the first linear drive mode oscillation of the two axis gyroscope structure (200). Longitudinal alignment of a lever with linear oscillation refers to that the longer sides or the longer dimension of the lever is aligned with the direction of the axis along which the respective linear oscillation occurs. While the alignment of a lever may in practice change when the lever moves, the lever is considered aligned with a linear oscillation if it's aligned when not excited to any movement. Each respective pair of a first lever (302a, 302b, 302c, 302d) and a second lever (303a, 303b, 303c, 303d) is mutually attached in a 90 degree angle at one end of the levers. An oblique spring (304a, 304b, 304c, 304d) guides the movement of the first and second levers.

Each one of the first levers (302a, 302b, 302c, 302d) is coupled to a drive mass (101a, 101b) of the one axis gyroscope structure (100), causing coupling of the movement of the first levers to the respective drive mass (101a, 101b), thus coupling the magnitude and phase of the first linear drive mode oscillation of the two axis gyroscope structure (200) into the second linear drive mode oscillation of the one axis gyroscope structure (100). In this example, first levers 302a and 302b are coupled with the upper drive mass (101a) and first levers 302c and 302d are coupled with the lower drive mass (101b). With a symmetric arrangement of the first levers (302a, 302b; 302c, 302d) on both opposite sides of the respective drive mass (101a, 101b), the y-axis direction of the linear drive mode oscillation of the drive masses (101a, 101b) of the one axis gyroscope structure (100) may further be supported.

An oblique spring (304a, 304b, 304c, 304d) is attached to the respective point of attaching of the first lever (302a, 302b, 302c, 302d) and the respective second lever (303a, 303b, 303c, 303d) in a 45 degree angle with respect to both the first lever and the second lever. The other end of each oblique spring (304a, 304b, 304c, 304d) is coupled to a suspension structure (162). The oblique spring (304a, 304b, 304c, 304d) may be formed as a beam, which may bend in the plane of the device. Together, the spring and lever structures (301a, 301b, 301c, 301d) form the spring lever system that causes the x-axis direction first linear drive mode oscillation of the driving two axis gyroscope structure (200) to be coupled to the one axis gyroscope structure (100) as an y-axis direction second linear drive mode oscillation. When the angle between each respective first lever (302a, 302b, 302c, 302d) and second lever (303a, 303b, 303c, 303d) is carefully set into direct angle, 90 degrees (within the manufacturing tolerances) and the oblique spring (304a, 304b, 304c, 304d) is placed in a 45 degree angle between the respective two levers, the direction of the force causing the first drive mode oscillation of the two axis gyroscope structure (200) in x-axis direction is coupled to a sum force in y-axis direction that is further coupled as a driving force of the one axis gyroscope structure, causing it to go into the second drive mode primary oscillation in y-axis direction. We can see that the spring lever system is reflection symmetric in view of both an x-direction axis and a y-direction axis traversing through the geometrical center of the one axis gyroscope (100). When the spring lever system is symmetric, the direction of the coupled second linear drive mode oscillation caused to the one axis gyroscope structure (100) is accurately perpendicular to the first linear drive mode oscillation of the two axis gyroscope structure (200), as the opposite spring and lever structures cancel any reactive forces caused by each other so that only the intended sum of parallel driving forces perpendicular to the direction of the first drive mode oscillation, causing the intended second linear drive mode oscillation for the one axis gyroscope structure (100) remain. Cancelling of the opposite reactive forces is caused by opposite directions of reactive forces caused by pairs of opposite spring and lever structures (301a, 301b; 301c, 301d) placed on opposite sides of the one axis gyroscope (100). With reactive forces we mean forces that are not in the direction of the intended second linear drive mode oscillation. For example, any unwanted rotational components are included in such reactive forces. Further, the 45 degree angle of the oblique spring causes the magnitude of the first linear drive mode oscillation of the two axis gyroscope structure (200) and the second linear drive mode oscillation of the one axis gyroscope structure (100) to be equal.

The end of each of the first levers (302a, 302b, 302c, 302d) that is not coupled to the respective second lever (303a, 303b, 303c, 303d) may further be coupled to a suspension structure (162) with a further oblique spring (305a, 305b, 305c, 305d), which may be a beam type spring. One end of this further oblique spring (305a, 305b, 305c, 305d) may be attached to the respective first lever (302a, 302b, 302c, 302d), while the opposite end of his further oblique spring may be attached to the suspension structure (162). The role of this additional oblique spring is mainly to support and balance the movement of the first lever.

In FIG. 3, we can also see supporting beams (124d, 125d) coupling the drive masses (101a, 101b) of the one axis gyroscope (100) to suspension structures (161, 162). For clarity reasons, references have only been marked for supporting beams supporting lower right half of drive mass 101b, but it can be seen, that similar supporting beams are arranged for both sides (left and right) of both drive masses (101a, 101b). These supporting beams allow the movement of the drive masses (101a, 101b) in the direction of the second linear drive mode oscillation (y-axis), but prevent movement in unwanted directions, such as in x-axis direction.

Let's have a closer look at of one of the spring and lever structures (301a). When the drive mass (202a) of the two axis gyroscope structure (200) moves left in negative x-axis direction, it pulls along the second lever (303a) coupled to the drive mass (202a). The oblique spring (304a) prevents the opposite end of the second lever (303a) coupled with the first lever (302a) from moving in directly in the same direction, but causes the oblique spring (304a) to start turning clockwise around the point at which it is coupled with the suspending structure (162). The first lever (302a) attached to the second lever (303a) is then pulled towards negative y-axis. The 45 degree angle of the oblique spring (304a) causes the magnitude of the movement of the first lever (302a) to be equal to the magnitude of the movement of the second lever (303a), but the direction is orthogonal. The coupling between the first lever (302a) and the drive mass (101a) of the one axis gyroscope structure (100) is stiff enough in y-axis direction to couple this movement of the first lever (302a) further to the drive mass (101a). When the direction of the drive mode oscillation movement reverses, the forces and the direction of movements reverse: when drive mass (202a) moves right towards the positive x-axis, it pushes the second lever (303a) in the same direction. The oblique spring (304a) starts turning counterclockwise and the first lever (302a) is pushed up in the direction of the y-axis. Each spring and lever structure (301a, 301b, 301c, 301d) works in the similar manner, but in different direction depending on the location around the one axis gyroscope (100). It may be understood, that a single spring and lever structure (301a, 301b, 301c, 301d) would introduce reactive forces that are not optimally directed: there would be rotational elements in the movement of the second lever (303a), the first lever (302a) and even the drive mass (101a) of the one axis gyroscope. Such rotational movement elements would be caused by each individual oblique spring (304a, 304b, 304c, 304d) when it turns around a fixed point at the point of connecting the spring to the suspension structure (162). However, by placing the spring and lever structures (301a, 301b; 301c, 301d) pairwise symmetrically on opposite sides of the one axis gyroscope structure (100), any reactive forces of the opposite pairs of spring and lever structures (301a, 301b; 301c, 301d) deviating from the intended linear direction of the coupled second linear drive mode oscillation cancel each other. Thus, the combined symmetrical spring lever system (300) results in coupling the first linear drive mode oscillation of the two axis gyroscope structure (200) into the second linear drive mode oscillation of the one axis gyroscope structure (100) accurately in the desired direction that is orthogonal to the original force causing the first linear drive mode oscillation. As a result, the three axis gyroscope becomes in a combined primary motion which consists of two mutually perpendicular linear primary mode oscillations.

Figure 4A:
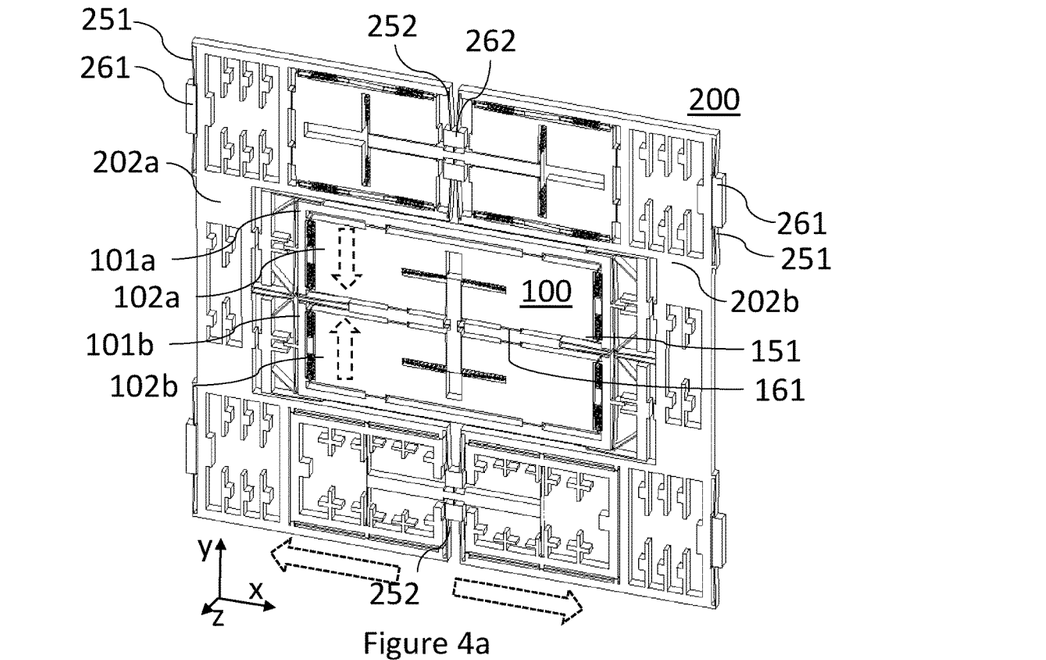
FIG. 4a illustrates a phase of the linear drive mode oscillation of the three axis gyroscope.
Figure 4B:
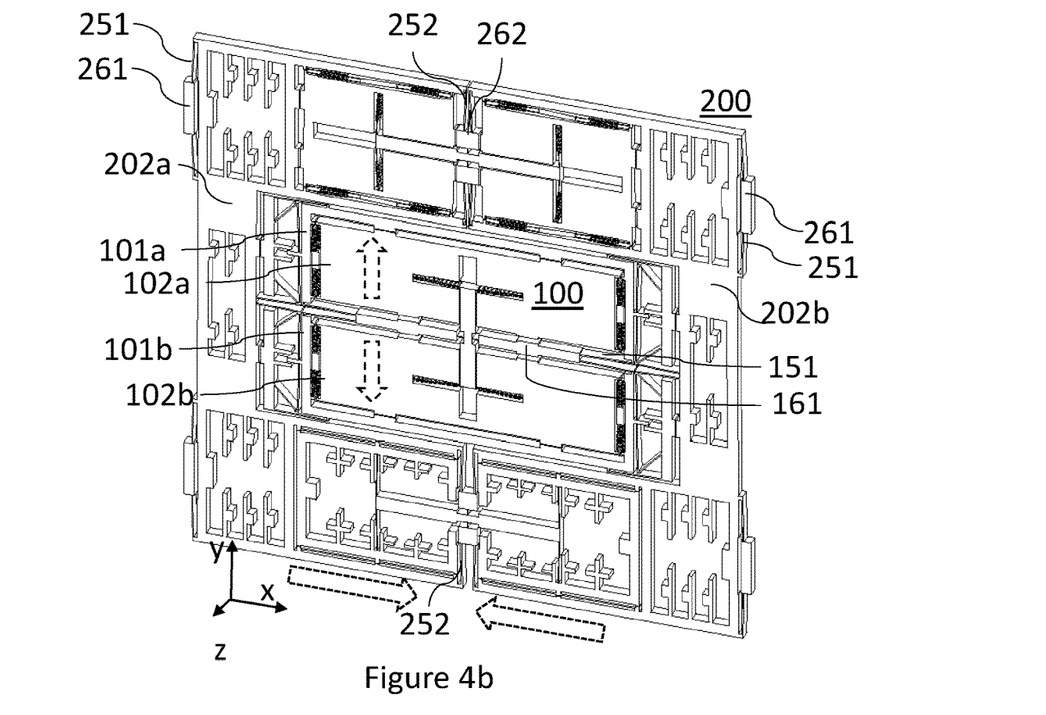
FIG. 4b illustrates another phase of the linear drive mode oscillation of the three axis gyroscope.

FIGS. 4a and 4b illustrate the linear drive mode oscillation of the three axis gyroscope.

In FIG. 4a the drive masses of the two-axis gyroscope structure (202a, 202b) are in a position after they have been moving away from each other in x-axis direction. This may perhaps best be seen near the center line of the two-axis gyroscope (200) on both sides of the symmetry axis in y-axis direction, where the first springs (252) coupling the drive masses (202a, 202b) of the two axis gyroscope structure (200) to first suspension structures (262) between the drive masses of the two axis gyroscope structure (202a, 202b) have bent away from the symmetry axis (y-axis). It may also be seen how the second springs (251) coupling the drive masses (202a, 202b) to second suspension structures (261) located outside the periphery of the inertial parts of the two axis gyroscope structure (200) have bent, allowing the drive masses (202a, 202b) to move closer to the respective second suspension structures (261) to which they are coupled with these second springs (251). The phase of the drive mode oscillation that has brought the two axis gyroscope structure (200) into this position is illustrated with the black dashed arrows below the gyroscope. The proof masses (203a, 203b, 204a, 204b) move along the drive masses (202a, 202b), following their phase of oscillation in the first linear drive mode oscillation.

FIG. 4a further shows how the drive masses (101a, 101b) of the one axis gyroscope structure (100) have been driven by the spring lever system (300) to a position, where the drive masses (101a, 101b) have linearly moved towards each other in y-axis direction. This may best be seen through the bended position of the springs (151) coupling the drive masses (101a, 101b) of the one axis gyroscope structure (100) to third suspension structures (161) located between the drive masses (101a, 101b). Preferably the displacement from the equilibrium position of the drive masses (101a, 101b) of the one axis gyroscope structure (100) is equal to the displacement from the equilibrium position of the drive masses (202a, 202b) of the two axis gyroscope structure (200). The proof masses of the one axis gyroscope structure (102a, 102b) move along the drive masses (101a, 101b) following their phase of oscillation in the second linear drive mode oscillation. The phase of the second drive mode oscillation that has brought the one axis gyroscope structure (100) into this position is illustrated with the white dashed arrows drawn on the one axis gyroscope structure.

In FIG. 4b the drive masses of the two-axis gyroscope structure (202a, 202b) are in a position after they have been moving towards each other in x-axis direction, i.e. the opposite phase of the linear drive mode oscillation from the phase illustrated in FIG. 4a. This may best be seen near the center line of the two-axis gyroscope (200) along the y-axis, where the first springs (252) coupling the drive masses (202a, 202b) of the two axis gyroscope structure (200) to first suspension structures (262) located between the drive masses (202a, 202b) of the two axis gyroscope structure (200) have bent towards the symmetry axis (y-axis). It may also be seen how the second springs (251) coupling the drive masses (202a, 202b) to second suspension structures (261) located outside the periphery of the inertial parts of the two axis gyroscope structure (200) have bent, allowing the drive masses (202a, 202b) to move away from the second suspension structures (261). The phase of the drive mode oscillation that has brought the two axis gyroscope structure (200) into this position is illustrated with the black dashed arrows below the gyroscope. The two pairs of proof masses of the two axes gyroscope (200) move along the drive masses (202a, 202b) in the first linear drive mode oscillation.

FIG. 4b further shows how the drive masses (101a, 101b) of the one axis gyroscope structure (100) have been driven by the spring lever system (300) to a position, where the drive masses (101a, 101b) have moved away from each other in y-axis direction. This may best be seen through the bended position of the springs (151) coupling the drive masses (101a, 101b) of the one axis gyroscope structure (100) to third suspension structures (161) located between the drive masses (101a, 101b). Preferably the displacement from the equilibrium position of the drive masses (101a, 101b) of the one axis gyroscope structure (100) is equal to the displacement from the equilibrium position of the drive masses (202a, 202b) of the two axis gyroscope structure (200). The proof masses (102a, 102b) of the one axis gyroscope structure (100) move along the drive masses (101a, 101b) in the same phase in the second linear drive mode oscillation. The phase of the second drive mode oscillation that has brought the one axis gyroscope structure (100) into this position is illustrated with the white dashed arrows drawn on the one axis gyroscope structure.

Exemplary embodiments of the gyroscope are described above, where the driving actuators (201) are arranged with the two axis gyroscope structure (200). However, in an alternative embodiment, the driving actuators may be arranged with the one axis gyroscope structure (100), and the spring lever system (300) may be used to couple the linear drive mode oscillation of the one axis gyroscope structure (100) towards the two axis gyroscope structure (200).

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A three axis gyroscope, comprising:
   a first gyroscope structure;
   a second gyroscope structure; and
   a lever spring system coupling a first linear drive mode oscillation of said first gyroscope structure and a second linear drive mode oscillation of said second gyroscope structure into one combined primary motion,
   wherein one of the first and second gyroscope structures comprises a two axis gyroscope structure and another of the first and second gyroscope structures comprises a one axis gyroscope structure, wherein said two axis gyroscope structure is configured to be driven into a first linear drive mode oscillation in the x-axis direction within a plane of the three axis gyroscope by exciting with driving actuators, wherein a first pair of proof masses of the two axis gyroscope structure is configured to be caused a linear detection motion in the y-axis direction by angular velocity about the z-axis, and a second pair of proof masses of the two axis gyroscope structure is configured to be caused a linear detection motion in the z-axis direction by angular velocity about the y-axis, wherein said one axis gyroscope structure is configured to be driven by coupling into a second linear drive mode oscillation in the y-axis direction within the plane of the three axis gyroscope, and wherein a pair of proof masses of the one axis gyroscope structure is configured to be caused a linear detection motion in the z-axis direction by angular velocity about the x-axis.

2. The three axis gyroscope of claim 1, wherein the first gyroscope structure is driven to the first linear drive mode oscillation by at least two driving actuators, and wherein the first linear drive mode oscillation of said first gyroscope structure is coupled to the second linear drive mode oscillation of the second gyroscope structure by the lever spring system connecting said first and second gyroscope structures.

3. The three axis gyroscope of claim 1, wherein the first linear drive mode oscillation is perpendicular to the second linear drive mode oscillation.

4. The three axis gyroscope of claim 1, wherein said lever spring system comprises a symmetrical arrangement of at least two lever and spring structures configured to mutually couple drive masses of said first and second gyroscope structures, each lever and spring structure comprising:

a first lever coupled with said first gyroscope structure longitudinally aligned with the first linear drive mode oscillation of said first gyroscope structure, a second lever coupled with said second gyroscope structure longitudinally aligned with the second linear drive mode oscillation of said second gyroscope structure, wherein the first lever and the second lever are attached to each other in a 90 degree angle at one end of the levers, and an oblique spring attached to a point of attaching the first lever and the second lever in a 45 degree angle with respect to the first lever and the second lever.

5. The three axis gyroscope of claim 4, wherein said oblique spring is configured to cause the first lever and the second lever to move an equally long distance away from their equilibrium positions in perpendicular directions, or to cause drive masses of the first and the second gyroscope structures to have equal linear drive mode oscillation amplitudes.

6. The three axis gyroscope of claim 4, wherein the first lever is coupled to a drive mass of said first gyroscope structure, and a longitudinal dimension of said first lever is aligned with the first linear drive mode oscillation of said first gyroscope structure, and wherein the second lever is coupled to a drive mass of said second gyroscope structure, and a longitudinal dimension of said second lever is aligned with the second linear drive mode oscillation of said second gyroscope structure.

7. The three axis gyroscope of claim 4, wherein said lever spring system comprises an even number of said lever and spring structures arranged symmetrically on opposite sides of a symmetry axis of the gyroscope in the plane of the three axis gyroscope.

8. The three axis gyroscope of claim 1, wherein the second gyroscope structure is disposed in an opening within a periphery of the first gyroscope structure, and wherein the lever spring system comprises an even number of lever and spring structures arranged symmetrically on opposite sides of the second gyroscope structure, so that the opposite reactive forces caused by said lever and spring structures on the second gyroscope structure cancel each other and the parallel driving forces caused by said lever and spring structures sum with each other, causing coupling of the first linear drive mode oscillation of the first gyroscope structure into a second linear drive mode oscillation of said second gyroscope structure.

9. The three axis gyroscope of claim 1, wherein said first gyroscope structure comprises a two axis gyroscope structure, and wherein said second gyroscope structure comprises a one axis gyroscope structure.

10. The three axis gyroscope of claim 1, wherein said two axis gyroscope structure comprises two pairs of proof masses, each pair configured for detecting angular velocity on a different axis of motion.

11. The three axis gyroscope of claim 10, wherein at least one pair of proof masses is mutually coupled with a lever allowing linear detection motion of the mutually coupled pair of proof masses in opposite phase and preventing linear detection motion of the mutually coupled pair of proof masses in same phase.

12. The three axis gyroscope of claim 11, wherein, in detection motion, the lever coupling the respective pair of proof masses is in rotating motion about the detection axis of the respective pair of proof masses.

13. The three axis gyroscope according to claim 1, wherein the detection motion of each proof mass of said first and second gyroscope structures comprises linear oscillation.

14. A three axis gyroscope, comprising:

a first gyroscope means for detecting first motion;

a second gyroscope means for detecting second motion; and a lever spring means coupling a first linear drive mode oscillation of the first gyroscope means and a second linear drive mode oscillation of the second gyroscope means into one combined primary motion, wherein one of the first and second gyroscope means detects motion in two axes, and wherein another of the first and second gyroscope means detects motion in one axis, wherein said first gyroscope means is configured to be driven into a first linear drive mode oscillation in the x-axis direction within a plane of the three axis gyroscope by exciting with driving actuators, wherein a first pair of proof masses of the gyroscope means for detecting motion in two axes is configured to be caused a linear detection motion in the y-axis direction by angular velocity about the z-axis, and a second pair of proof masses of the gyroscope means for detecting motion in two axes is configured to be caused a linear detection motion in the z-axis direction by angular velocity about the y-axis, wherein said gyroscope means for detecting motion in one axis is configured to be driven by coupling into a second linear drive mode oscillation in the y-axis direction within the plane of the three axis gyroscope, and wherein a pair of proof masses of the gyroscope means configured for detecting motion in one axis is configured to be caused a linear detection motion in the z-axis direction by angular velocity about the x-axis.

15. The three axis gyroscope of claim 14,
wherein the first gyroscope means is coupled to at least two driving actuator means, wherein the at least two driving actuator means drive the first gyroscope means to the first linear drive mode oscillation, and wherein the first linear drive mode oscillation of the first gyroscope means is coupled to a second linear drive mode oscillation of the second gyroscope means by the lever spring means connecting the first and second gyroscope means.

16. The three axis gyroscope of claim 14, wherein the first linear drive mode oscillation is perpendicular to the second linear drive mode oscillation.

17. The three axis gyroscope of claim 14, wherein the lever spring means includes a symmetrical arrangement of at least two lever and spring structure means for mutually coupling drive masses of the first and second gyroscope means, wherein each lever and spring structure means includes:

a first lever means coupled with the first gyroscope means longitudinally aligned with the first linear drive mode oscillation of the first gyroscope means, a second lever means coupled with the second gyroscope means longitudinally aligned with the second linear drive mode oscillation of the second gyroscope means, wherein the first lever means and the second lever means are attached to each other in a 90 degree angle at one end of each lever means, and an oblique spring means attached to a point of attaching the first lever means and the second lever means in a 45 degree angle with respect to the first lever means and the second lever means.

18. The three axis gyroscope of claim 17, wherein the oblique spring means is for causing the first lever means and the second lever means to move an equally long distance away from their equilibrium positions in the perpendicular directions, or to cause drive masses of the first and second gyroscope means to have equal linear drive mode oscillation amplitudes.

19. The three axis gyroscope of claim 17,
wherein the first lever means is coupled to a drive mass of the first gyroscope means, and the longitudinal direction of the first lever means is aligned with the first linear drive mode oscillation of the first gyroscope means, and wherein the second lever means is coupled to a drive mass of the second gyroscope means, and a longitudinal dimension of the second lever means is aligned with the second linear drive mode oscillation of the second gyroscope means.

* * * * *